June 27, 1967  C. SOLOMONS ETAL  3,328,277

OXYGEN SENSOR WITH A SCAVENGER ELECTRODE

Filed April 3, 1964

INVENTORS
CYRIL SOLOMONS
JOHN P. HYNES

BY *Robert O. Vidas*

ATTORNEY

United States Patent Office 3,328,277
Patented June 27, 1967

3,328,277
OXYGEN SENSOR WITH A SCAVENGER ELECTRODE
Cyril Solomons, Edina, and John P. Hynes, Minnetonka Village, Minn., assignors to Honeywell Inc., a corporation of Delaware
Filed Apr. 3, 1964, Ser. No. 357,094
7 Claims. (Cl. 204—195)

ABSTRACT OF THE DISCLOSURE

An analysis cell of the dissolved oxygen type utilizing a membrane permeable to the gas to be analyzed wherein a scavenger electrode is provided separate from the measuring anode and cathode to improve the time response of the cell.

---

The present invention is directed to an improved electrochemical cell of the polarographic type used in the analysis of the quantity of oxygen in a gaseous mixture or dissolved in a liquid. More specifically, the present invention is directed to such an electrochemical cell wherein the measuring electrode and the reference electrode are separated from the fluid being analyzed by a membrane which is permeable to the gas being analyzed. Cells of this type are well known in the art and are useful for the determination of gaseous substances other than oxygen, although oxygen has been the substance most commonly determined by such cells.

Prior art cells have all had basically the same general construction and operation. For the purpose of example, oxygen analyzing cells will be discussed. No restriction to oxygen cells is implied, however. The present invention will operate in the same manner in the analysis of other gases. The cell generally consists of chemically inert nonconductive material defining a chamber having an opening across at least one end thereof. Across the opening in the chamber there is placed a membrane, such as polyethylene, which is permeable to the gas being analyzed, but which is not permeable to a liquid containing the gas being analyzed. Facing the interior surface of the membrane is a cathode member usually of a metal such as platinum or preferably gold. At a spaced distance from the cathode is an anode member, which is typically silver metal, having a surface film of a silver compound such as silver chloride or silver oxide. An electrolytic fluid such as a 0.1 N solution of potassium chloride or 0.1 N potassium hydroxide or a mixture of the two electrically connects the cathode and anode member. The anode and cathode are connected to a direct current power supply and a current measuring means such as a micro-ammeter. The cathode becomes polarized, and is depolarized by the oxygen in the gas which passes through the permeable membrane. The amount of current which flows is a function of the amount of oxygen which passes through the permeable membrane and thus there is provided a device for measuring the amount of oxygen in a gas or dissolved oxygen in a liquid.

While such systems operate in a generally satisfactory manner, they do possess several drawbacks. One such shortcoming is the fact that any oxygen which passes into the test chamber fluid and is not immediately consumed at the cathode tends to cause errors in the operation of the device. If the oxygen concentration has built up in the test cell fluid, the cell will not respond quickly to a decrease in the concentration of oxygen in the liquid being analyzed. Instead, it will indicate falsely that more oxygen is present in the sample being analyzed than is actually the case. Again, changes in the indicated reading must result from changes in both the concentration of internal oxygen and that of external oxygen. Since the former change is slower than the latter in most cells of prior art configuration the cell response becomes slowed down. Another disadvantage of prior art cells arises from the fact that these units will periodically require replenishment or service in the normal course of use. When these cells are initially installed, or replaced, a considerable period of time—up to 24 hours—is necessary to have the cell reach a stable equilibrium condition. This is due to the presence of small quantities of oxygen in the test chamber fluid.

I have found that these disadvantages of the prior art cells can be readily overcome through the use of a scavenger electrode within the test cell.

Therefore, it is an object of the present invention to provide an improved electrochemical cell for the determination of the quantity of a reactive gas in a mixture of gases or dissolved in a liquid;

It is a further object of the present invention to provide an electrochemical cell of the polarographic type wherein a scavenger electrode is provided to prevent the build-up of concentrations of the gas being analyzed in the test cell fluid and to aid in the cleaning up of any such gas which exists in the test cell fluid;

Other and further objects of the present invention will be apparent from a study of the specification and drawings wherein.

Figure 1:
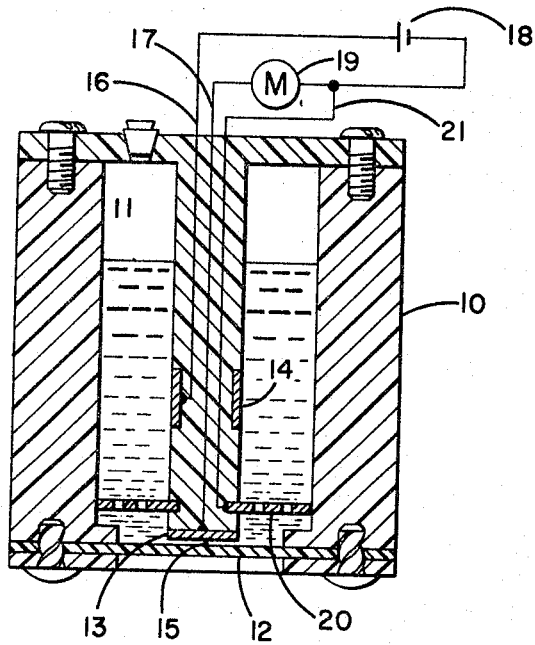
FIGURE 1 is a schematic illustration of a test cell of the prior art type but incorporating the invention.

Referring now to the drawings in FIGURE 1 there is illustrated a cell which is essentially in accordance with the teachings of the prior art, but which also incorporates the present invention. There is illustrated a non-conductive, chemically inert housing 10 forming a chamber generally designated 11. Across the lower portion of this chamber, there is placed a membrane 12 which is permeable to the gas to be tested. In the instance of oxygen, materials such as polyethylene, polytetrafluoethylene, and the like are suitable. The choice of membrane is dictated by the material being analyzed. These are factors known in the art and will not be discussed further herein. In the interior of the cell there is provided an electrode 13 which acts as the cathode. The anode 14 is located remotely from the cathode. The cathode 13, as can be seen in the drawing, is separated by a very small gap 15 from the permeable membrane 12. The gap 15 must be very small in order to make the cell function rapidly in response to changing concentrations of oxygen in the fluid being tested. However, particularly when a large area cathode and corresponding large currents are involved, it must also be large enough to permit ready exchange of the electrolyte substance within the gap with the main bulk of the electrolyte in the cell. This is necessary to allow the reaction products to be removed from the reaction area. As in the prior art cells, lead means 16 and 17 are provided for electrical connection to the anode and cathode, respectively. The power source 18 and meter 19 provide the electrical supply and the current measuring means necessary for determining the concentration of oxygen which has passed through the membrane.

As has been previously noted, cells of this type perform in a reasonable satisfactory manner with the exception that they tend to have a build-up of oxygen in the main bulk of the electrolyte under prolonged exposure to high concentrations of oxygen. Also, the prior art cells do not come into equilibrium condition quickly when initially installed into operation.

I have found that both these difficulties can be overcome through the use of a scavenger electrode. In FIGURE 1 the scavenger electrode is indicated as 20 with a lead means 21 connecting the scavenger electrode to the power supply side of meter 19. Thus, the passage of current through the scavenger electrode will not affect the meter reading. The scavenger electrode 20 may take many different forms. It may be a screen or grid or be made of a porous sintered metal. The material should preferably be the same as the measuring cathode to prevent a galvanic cell from being formed by the combination of electrode 13 with scavenger electrode 20. The thickness is not critical although for cost considerations it should be as thin as possible, consistent with being of sufficient thickness to have ruggedness in service. A thickness of about 1 mil is satisfactory. Desirably, the scavenger electrode will act as a barrier to the passage of oxygen (or other reactive gases) into or from the main bulk of the electrolyte. The scavenger electrode can be in the form of a fine mesh screen which will permit passage of the cell fluid so as to allow the ready exchange of electrolyte.

While the scavenger electrode is preferably electrically connected to the power supply side of the meter, as shown in the drawings, so that any current flowing through the scavenger electrode does not pass through the meter, the scavenger electrode may also be electrically connected so any current flowing therethrough will pass through the meter. Such an arrangement does not possess all the advantages of the preferred arrangement, though it is better than no scavenger electrode at all.

Figure 2:
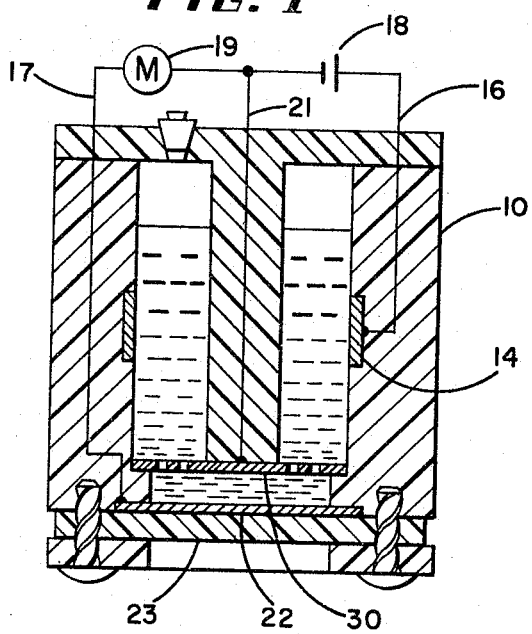
FIGURE 2 is an improved form of an electrochemical cell of the type shown in FIGURE 1 as disclosed in the co-pending application of Cyril Solomons entitled "Electrochemical Cells," filed Feb. 6, 1964, Ser. No. 343,098, and assigned to the same assignee as the present invention, modified to include the present invention.

In FIGURE 2 is illustrated a cell in accordance with the previously noted co-pending application or Cyril Solomons and having, in addition to the structure of the cell of the co-pending application, a scavenger electrode 30. The cell in FIGURE 2 is essentially the cell of FIGURE 1 with one important change. This change involves the actual measuring cathode. In the previously identified co-pending application, there is disclosed the use of a metallized permeable membrane as the actual cathode member. The membrane may be of a number of different materials as in the prior art. The interior facing surface of the membrane is metallized with a thin film of gold (or other metal) so as to be electrically continuous, but still permeable to the gas passing through the membrane. The advantage of this type of construction is that it tends to allow much higher current flow due to the increased area of the electrode without the dangers of having some of the oxygen pass through and not react at the cathode. As the cathode is immediately adjacent the surface through which the oxygen passes, it very readily provides a reaction site. While this type of construction markedly improves the shortcomings of the prior art on which FIGURE 1 is based in that the amount of oxygen not reacting at the cathode and therefore passing into the main body of the electrolyte is considerably reduced, it still does not provide as rapid a means of consuming any oxygen present in the bulk fluid prior to actual installation of the cell. In FIGURE 2, I have shown the permeable membrane 23 having a metallized film 22 to act as the cathode member. The vertical thicknesses have been exaggerated for purposes of clarity. Other parts which are similar to and operate in the same manner as FIGURE 1 are numerically identified as in FIGURE 1. As in FIGURE 1 the scavenger electrode preferably bypasses meter 19 so as not to interfere with the actual reading of the measuring electrode.

Our invention has been described when utilized in a system for the determination of oxygen dissolved in a fluid, although as previously indicated the invention will be applicable to other oxidizing gases as well as to reducing gases such as sulfur dioxide. In this latter case the scavenger electrode would be a second anode member rather than, as in the oxygen analyzing system described above, a second cathode.

Having described our invention, we claim:
1. An electrochemical cell for analysis of the concentration of a reducible gas dissolved in a fluid comprising:
   (a) A chemically inert non-conductive material defining a chamber having an opening therein,
   (b) A membrane in liquid-tight engagement with said opening, said membrane being permeable to said reducible gas and impermeable to liquids,
   (c) A first cathode and an anode positioned within said chamber,
   (d) A second cathode within said chamber adapted to act as a scavenger electrode,
   (e) An electrolyte contacting said anode and said cathodes,
   (f) Lead means for said anode and said first and second cathodes, and
   (g) A measuring circuit bridging said lead means including meter means connected between the anode lead means and the first cathode lead means but not between the anode lead means and the scavenger cathode lead means.

2. An electrochemical cell for analysis of the concentration of oxygen dissolved in a fluid comprising:
   (a) A chemically inert non-conductive material defining a chamber having an opening therein,
   (b) An oxygen permeable liquid impermeable membrane in liquid-tight engagement with said opening,
   (c) A first cathode and an anode positioned within said chamber,
   (d) A second cathode within said chamber adapted to act as a scavenger electrode,
   (e) An electrolyte contacting said anode and said cathodes,
   (f) Lead means for said anode and said first and second cathodes, and
   (g) A measuring circuit bridging said lead means including meter means connected between the anode lead means and the first cathode lead means but not between the anode lead means and the scavenger cathode lead means.

3. An electrochemical cell for analysis of the concentration of a reducible gas dissolved in a fluid comprising:
   (a) A chemically inert non-conductive material defining a chamber having an opening therein,
   (b) A membrane in liquid-tight engagement with said opening, said membrane being permeable to said reducible gas and impermeable to liquids,
   (c) A first cathode and an anode positioned within said chamber,
   (d) A second cathode adapted to act as a scavanger cathode positioned within said chamber to separate the chamber into two regions, said second cathode being porous to permit passage of electrolyte therethrough,
   (e) An electrolyte contacting said anodes and said cathodes,
   (f) Lead means for said anode and said first and second cathodes, and
   (g) A measuring circuit bridging said lead means including meter means connected between the anode lead means and the first cathode lead means but not between the anode lead means and the scavenger cathode lead means.

4. A device in accordance with claim 1 wherein the cathodes are of gold.

5. An electrochemical cell for analysis of the concentration of oxygen dissolved in a fluid comprising:
   (a) A chemically inert nonconductive material defining a chamber having an opening therein,
   (b) A membrane in liquid-tight engagement with said opening, said membrane being permeable to oxygen and impermeable to liquids, (c) A first cathode and an anode positioned within said chamber, said anode being of silver metal,
(d) A second cathode within said chamber adapted to act as a scavenger electrode, said first and second cathodes being of a metal selected from the group consisting of gold and platinum,
(e) An aqueous electrolyte solution selected from the group consisting of potassium chloride, potassium hydroxide and mixtures thereof contacting said anodes and said cathodes,
(f) Lead means for said anode and said first and second cathodes, and
(g) A measuring circuit bridging said lead means including meter means connected between the anode lead means and the first cathode lead means but not between the anode lead means and the scavenger cathode lead means.

6. An electrochemical cell for analysis of the concentration of a reactive gas dissolved in a fluid comprising:
(a) A chemically inert non-conductive material defining a chamber having an opening at one end thereof,
(b) A membrane in liquid-tight engagement with said opening, said membrane being permeable to said reactive gas and impermeable to liquids,
(c) A cathode and an anode positioned within said chamber,
(d) A scavenger electrode positioned within said chamber,
(e) An electrolyte contacting said anode, cathode, and said scavenger electrode,
(f) Lead means for said anode, cathode, and said scavenger electrode, and
(g) A measuring circuit including meter means bridging the anode lead means and the cathode lead means but not including the scavenger electrode lead means.

7. An electrochemical cell for analysis of the concentration of a reducible gas dissolved in a fluid comprising:
(a) A chemically inert non-conductive material defining a chamber having an opening therein,
(b) A membrane in liquid-tight engagement with said opening, said membrane being permeable to said reducible gas and impermeable to liquids,
(c) A first cathode and an anode positioned within said chamber,
(d) A second cathode within said chamber adapted to act as a scavenger electrode,
(e) An electrolyte contacting said anode and said cathodes,
(f) Lead means for said anode and said cathodes,
(g) A circuit bridging said lead means including means for impressing a voltage across said anode and said cathodes, and
(h) measuring means in said circuit connected so as to determine the current flow across said anode and said first cathode but not between said scavenger cathode and said anode.

References Cited
UNITED STATES PATENTS

| | | | |
|---|---|---|---|
| 2,805,191 | 9/1957 | Hersch | 204—1 |
| 3,071,530 | 1/1963 | Neville | 204—195 |
| 3,260,656 | 7/1966 | Ross | 204—195 |
| 3,272,725 | 9/1966 | Garst | 204—195 |

JOHN H. MACK, *Primary Examiner.*

T. TUNG, *Assistant Examiner.*